US012779709B2

(12) United States Patent
Itokazu

(10) Patent No.: US 12,779,709 B2
(45) Date of Patent: Nov. 3, 2026

(54) SEAL STRUCTURE FOR AN ARM CONSTITUTING A ROBOT

(71) Applicant: FANUC CORPORATION, Yamanashi (JP)

(72) Inventor: Kenta Itokazu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/727,690

(22) PCT Filed: Jan. 31, 2022

(86) PCT No.: PCT/JP2022/003633
§ 371 (c)(1),
(2) Date: Jul. 10, 2024

(87) PCT Pub. No.: WO2023/145086
PCT Pub. Date: Aug. 3, 2023

(65) Prior Publication Data
US 2025/0100169 A1 Mar. 27, 2025

(51) Int. Cl.
*B25J 19/00* (2006.01)

(52) U.S. Cl.
CPC ................................ *B25J 19/0075* (2013.01)

(58) Field of Classification Search
CPC ..... F16J 15/062; F04C 27/005; B25J 19/0075
See application file for complete search history.

(56) References Cited

U.S. PATENT DOCUMENTS

2001/0040037 A1* 11/2001 Negishi .................. H05K 5/061 174/17 CT
2013/0063878 A1* 3/2013 Kirihara ................. H05K 5/061 361/679.01
2013/0200075 A1* 8/2013 Tamura .................. H05K 5/061 220/378
2013/0273985 A1* 10/2013 Kageyama ............. H04M 1/18 455/575.8
2015/0337962 A1* 11/2015 Lojewski ............... F16J 15/062 277/641
2016/0109683 A1* 4/2016 Sato ....................... F16J 15/021 359/871
2016/0184986 A1* 6/2016 Procyshyn ............... B25J 18/04 74/490.01
2019/0386473 A1* 12/2019 Kawashita ............. H05K 5/061
2020/0072353 A1* 3/2020 Bury .................... F16J 15/0818
2021/0127519 A1* 4/2021 Thrailkill ............... H05K 5/062
(Continued)

FOREIGN PATENT DOCUMENTS

CN 203655054 U * 6/2014
JP H09-240539 A 9/1997
JP 2000335624 A * 12/2000
(Continued)

*Primary Examiner* — Eugene G Byrd
(74) *Attorney, Agent, or Firm* — HAUPTMAN HAM, LLP

(57) ABSTRACT

The seal structure according to one aspect of the present disclosure can be widely applied between various members to be sealed. A seal structure includes a first member, a sealing member, and a second member fastened to the first member with the sealing member interposed therebetween. The first member has a groove for receiving liquid that has entered from the outside between the first member and the sealing member.

1 Claim, 10 Drawing Sheets

(56) References Cited

U.S. PATENT DOCUMENTS

| | | | | |
|---|---|---|---|---|
| 2021/0246982 | A1* | 8/2021 | Togo | F16J 15/104 |
| 2022/0112590 | A1* | 4/2022 | Rustici Venturini | B25J 19/007 |

FOREIGN PATENT DOCUMENTS

| | | | | | |
|---|---|---|---|---|---|
| JP | 4140814 | B2 | * | 8/2008 | C21C 7/04 |
| JP | 2014035071 | A | * | 2/2014 | |
| JP | 2014-120579 | A | | 6/2014 | |
| JP | 2016152177 | A | * | 8/2016 | H05K 5/061 |
| JP | 2019-220538 | A | | 12/2019 | |
| JP | 6866261 | B2 | * | 4/2021 | H05K 5/0056 |
| KR | 20030088861 | A | * | 11/2003 | |
| KR | 101146214 | B1 | * | 5/2012 | H05K 5/065 |
| KR | 200482264 | Y1 | * | 1/2017 | H01Q 1/1242 |
| KR | 20190086565 | A | * | 7/2019 | F16L 47/065 |
| TW | 354258 | U | * | 11/2008 | |
| WO | WO-2006008856 | A1 | * | 1/2006 | F16J 15/104 |

* cited by examiner

SEAL STRUCTURE FOR AN ARM CONSTITUTING A ROBOT

RELATED APPLICATIONS

The present application is a National Phase of International Application No. PCT/JP2022/003633 filed Jan. 31, 2022.

TECHNICAL FIELD

This disclosure relates generally to a seal structure.

BACKGROUND ART

In recent years, technologies related to waterproofing of robots have become important as the robot's application environment has expanded, and various waterproof structures have been proposed (for example, Patent Literature 1). In general, waterproofing between the cover and another part is achieved by fastening them using fastening members such as bolts with a sealing member such as a gasket or rubber packing sandwiched therebetween.

In a waterproof structure in which a sealing member is simply sandwiched between members to be waterproofed, it is necessary to place fastening members such as bolts at a narrow pitch to fasten the two members in order to secure some surface pressure between the sealing member and each of the two members. However, placing fastening members such as bolts at a narrow pitch increases the number of fastening members and also deteriorates the appearance. In addition, when at least one of the two members is made of resin, there is a possibility that the resin member is deformed due to aging or the like and sufficient surface pressure cannot be obtained, so that the members cannot be waterproofed.

CITATION LIST

Patent Literature

Patent Literature 1: Japanese Unexamined Patent Application Publication No. 2019-220538.

DETAILED DESCRIPTION

Figure 1:
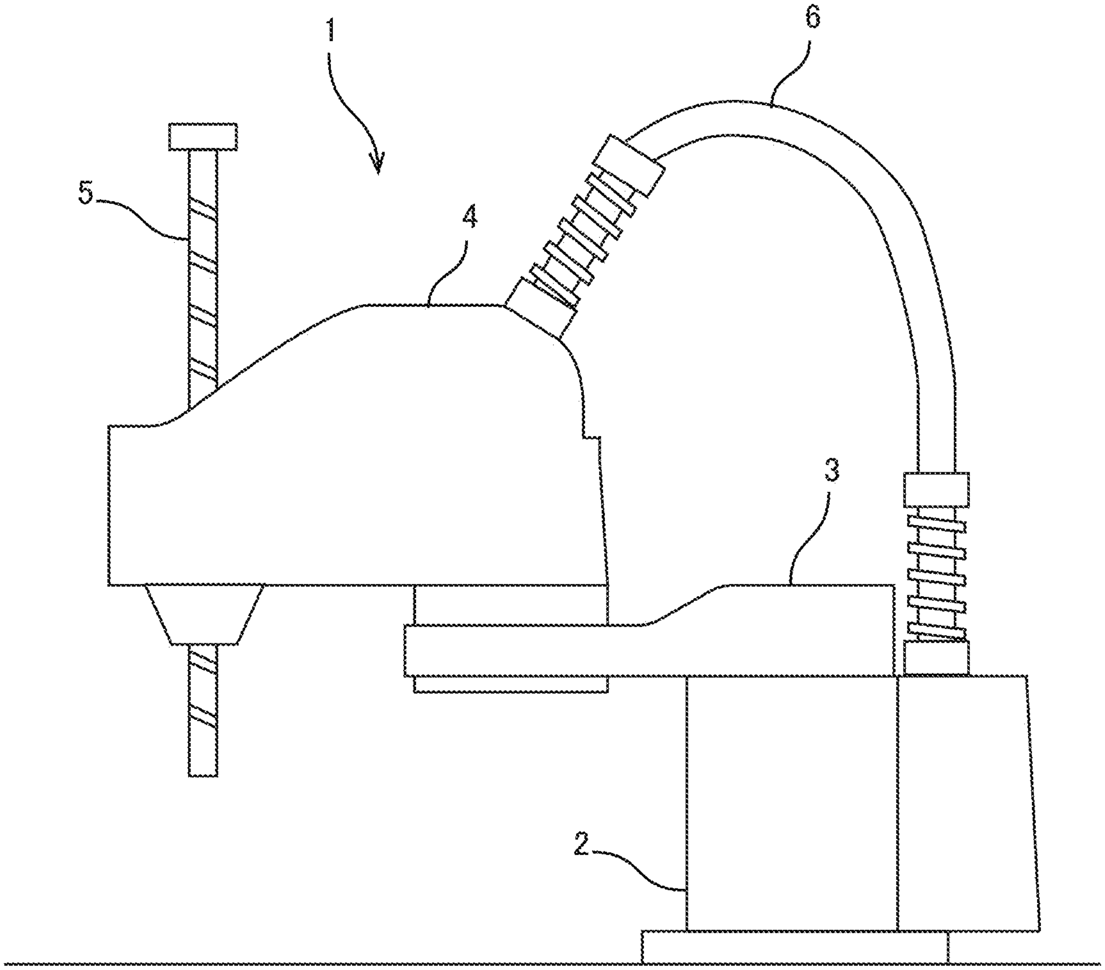
FIG. 1 is a side view showing a SCARA robot to which a seal structure according to the present embodiment is applied.

A seal structure according to one aspect of the present disclosure includes a first member, a sealing member, and a second member fastened to the first member with the seal member interposed therebetween. The first member has a groove for receiving liquid that has entered from the outside between the first member and the sealing member.

Hereinafter, a seal structure according to the present embodiment will be described with reference to the drawings. In the following description, constituent elements having substantially the same function and configuration are denoted by the same reference numeral, and repetitive descriptions will be given only where necessary.

The seal structure according to the present embodiment will be described with reference to FIG. 1 to FIG. 7. In the present embodiment, an example in which the seal structure according to the present embodiment is applied to an arm constituting a SCARA robot will be described. However, the seal structure according to the present invention can be widely applied to two members to which a waterproof structure is to be provided. Therefore, the embodiment is not limited to the arm constituting the SCARA robot.

As shown in FIG. 1, a SCARA robot 1 includes a base 2 fixed to an installation surface, a first arm 3 connected to the base 2 via a first joint having a first rotation axis perpendicular to the installation surface, a second arm 4 connected to the first arm 3 via a second joint having a second rotation axis parallel to the first rotation axis, a tool shaft 5 provided to be able to freely move up and down along a third axis parallel to the first and second rotation axes with respect to the second arm 4, and a wire body 6 connecting the first arm 3 and the second arm 4 and wired to the outside of the SCARA robot 1.

Figure 2:
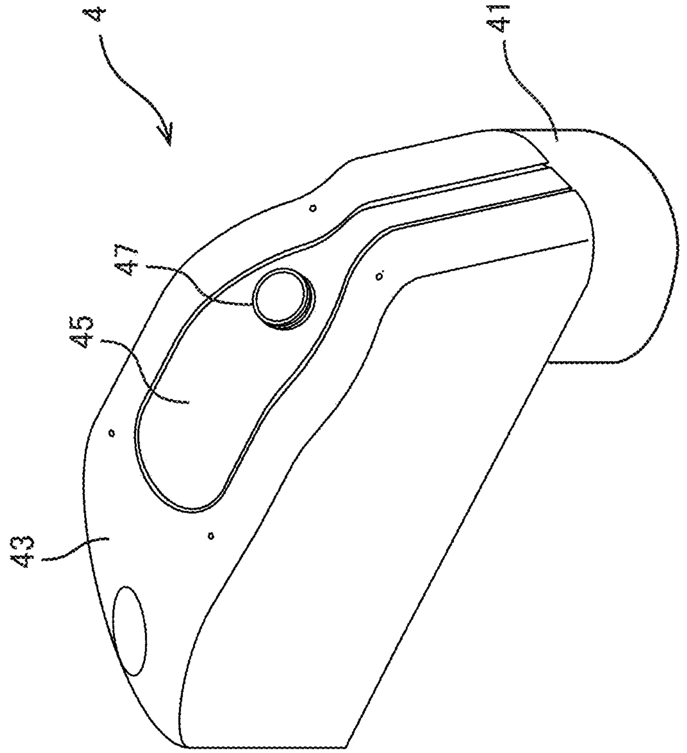
FIG. 2 is a perspective view showing a second arm of the SCARA robot of FIG. 1.
Figure 3:
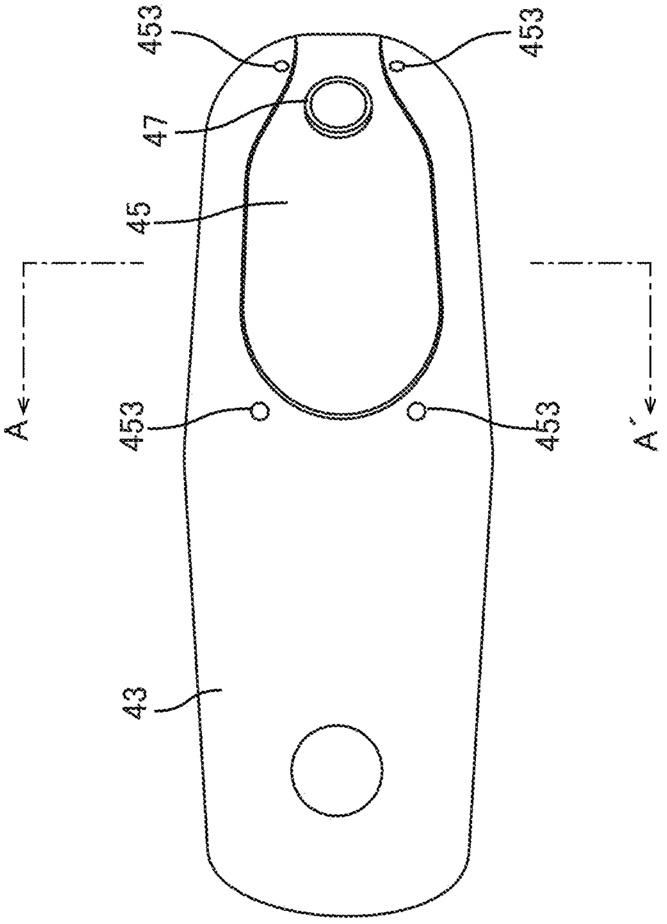
FIG. 3 is a plan view showing the second arm of the SCARA robot of FIG. 1.
Figure 4:
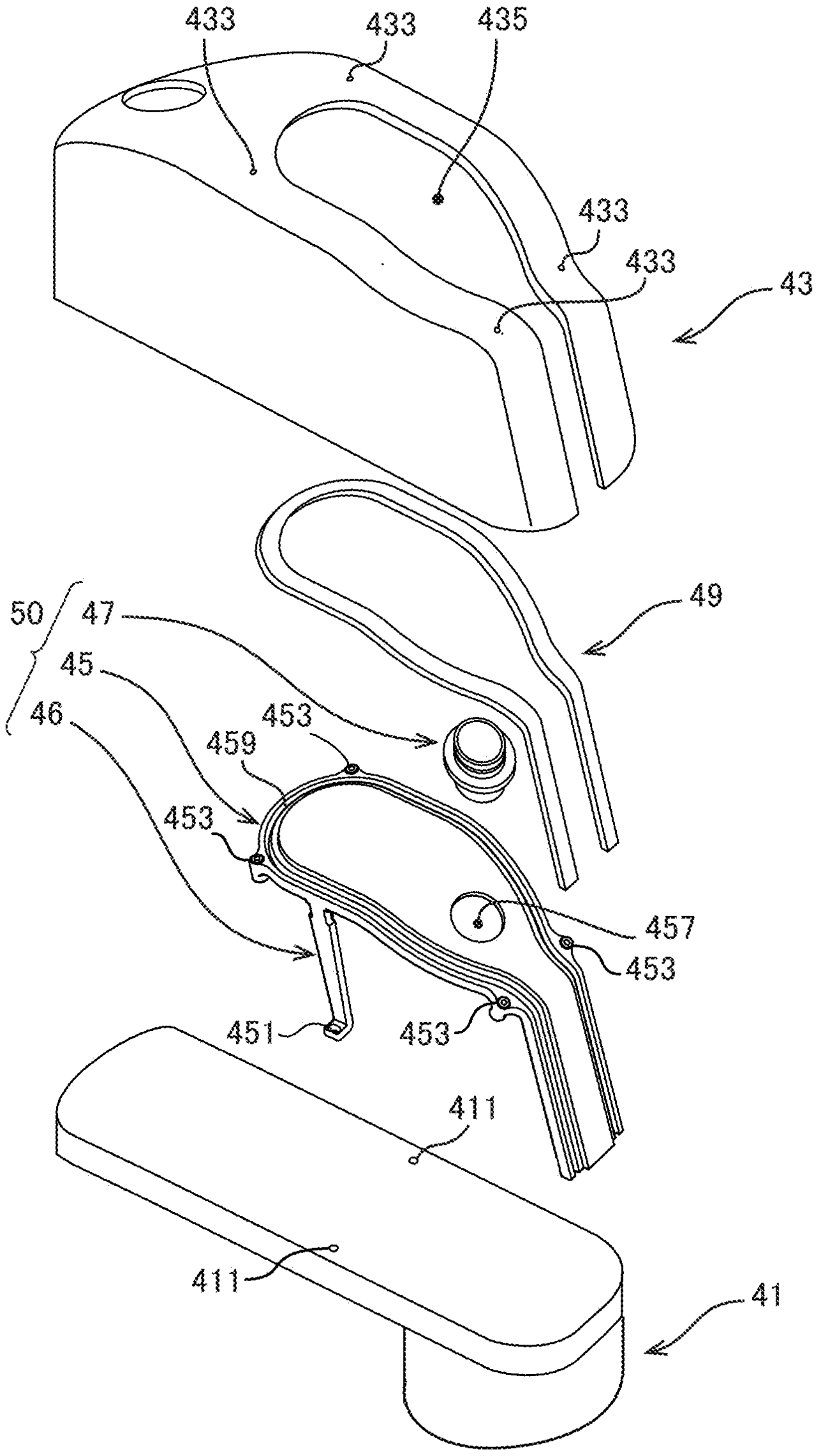
FIG. 4 is an exploded perspective view of the second arm of FIG. 2.

As shown in FIG. 2, FIG. 3, and FIG. 4, the second arm 4 has an arm base 41 corresponding to a rotating portion of the first joint and a fixed portion of the second joint, and a box-shaped cover 43 that is placed over the arm base 41. For example, the arm base 41 is a casting, and the cover 43 is made of hard resin. Although not shown, a plurality of wire bodies such as cables and air tubes, and a plurality of parts such as motors, gears, pulleys, belts, and the like are accommodated in a space inside the second arm 4 formed by the arm base 41 and the cover 43.

The cover 43 has an upper wall located above the second arm 4 and a side wall extending downward from the peripheral edge of the upper wall. A portion of the housing of the second arm 4 from the upper center to the lower rear of the housing, which extends from near the center to the rear of the upper wall and from the upper end to the lower end of the side wall of the cover 43, is cut out in a U-shape. An interface mechanism 50 is attached to the cutout portion 435.

The interface mechanism 50 is a connecting portion for connecting a wire body (not shown) wired inside the second arm 4 and the wire body 6 wired outside the second arm 4 to each other. As shown in FIG. 4, the interface mechanism 50 includes a fixing plate 45, a support post 46 that supports the fixing plate 45 with respect to the arm base 41, and a connector 47 that connects the wire bodies to each other. The fixing plate 45 and the support post 46 are integrally formed.

The connector 47 is attached to an attachment hole 457 formed in the fixing plate 45. A connection point of one end of the connector 47 is located inside the second arm 4, and a connection point of the other end is located outside the second arm 4. An end of the wire body inside the second arm 4 are connected to one end of the connector 47, and an end of the wire body 6 outside the second arm 4 is connected to the other end of the connector 47. As a result, the wire body inside the second arm 4 is connected to the wire body 6 outside the second arm 4.

The fixing plate 45 is fixed to the arm base 41 together with the support post 46. A plurality of insertion holes 451 through which screws are inserted are formed in the support post 46. A plurality of screw holes 411 into which screws are screwed are formed in the arm base 41 at positions aligned with the plurality of insertion holes 451 formed in the support post 46. The fixing plate 45 and the cover 43 are fastened to each other by bolts. The fixing plate 45 has a plurality of screw holes 453 into which bolts are screwed. The plurality of screw holes 453 are distributed near the peripheral edge of the fixing plate 45. The cover 43 has a plurality of insertion holes 433 through which the bolts are inserted. The plurality of insertion holes 433 are provided at positions aligned with the plurality of screw holes 453 formed in the fixing plate 45.

The fixing plate 45 has a similar shape that is slightly larger than the cutout portion 435 of the cover 43. The fixing plate 45 is formed in a substantially L-shape in side view, in which an upper plate that is fitted from the inside of the second arm 4 into the cutout portion formed in the upper wall of the cover 43 and a side plate that is fitted from the inside of the second arm 4 into the cutout portion formed in the side wall of the cover 43 are coupled. A center portion of the fixing plate 45 having substantially the same size as the cutout portion 435 of the cover 43 protrudes upward by the thickness of the upper wall of the cover 43 as compared with the peripheral portion of the fixing plate 45 so as to be fitted in the cutout portion 435 of the cover 43.

The seal structure according to the present embodiment is applied for drip-proofing and dust-proofing between the cover 43 and the fixing plate 45. The fixing plate 45 corresponds to the first member, and the cover 43 corresponds to the second member. The fixing plate 45 and the cover 43 are fastened by bolts with a sealing member 49 sandwiched therebetween. The sealing member 49 has a substantially U-shape that matches the peripheral shape of the cutout portion 435 of the cover 43. As the sealing member 49, a gasket made of metal or nonmetal (rubber or hard resin) can be used.

Figure 5:
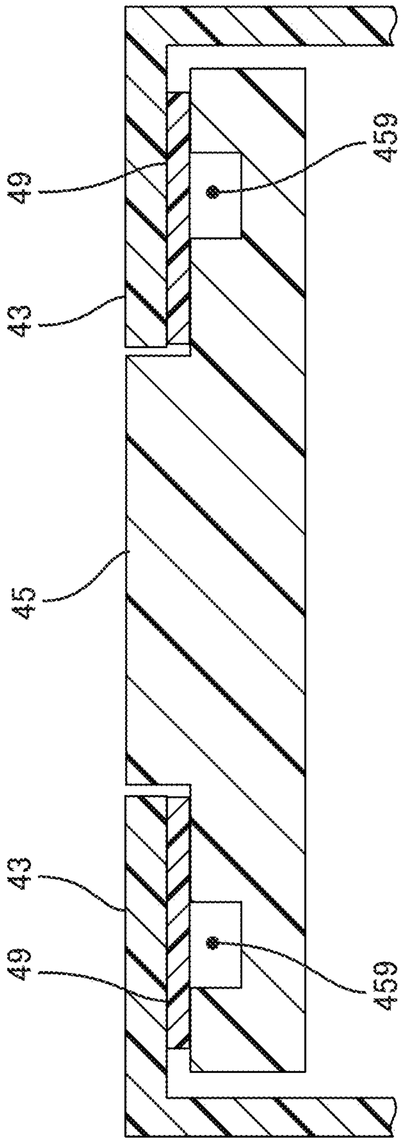
FIG. 5 is a cross-sectional view taken along line A-A' in FIG. 3, showing an example of the seal structure according to the present embodiment.
Figure 6:
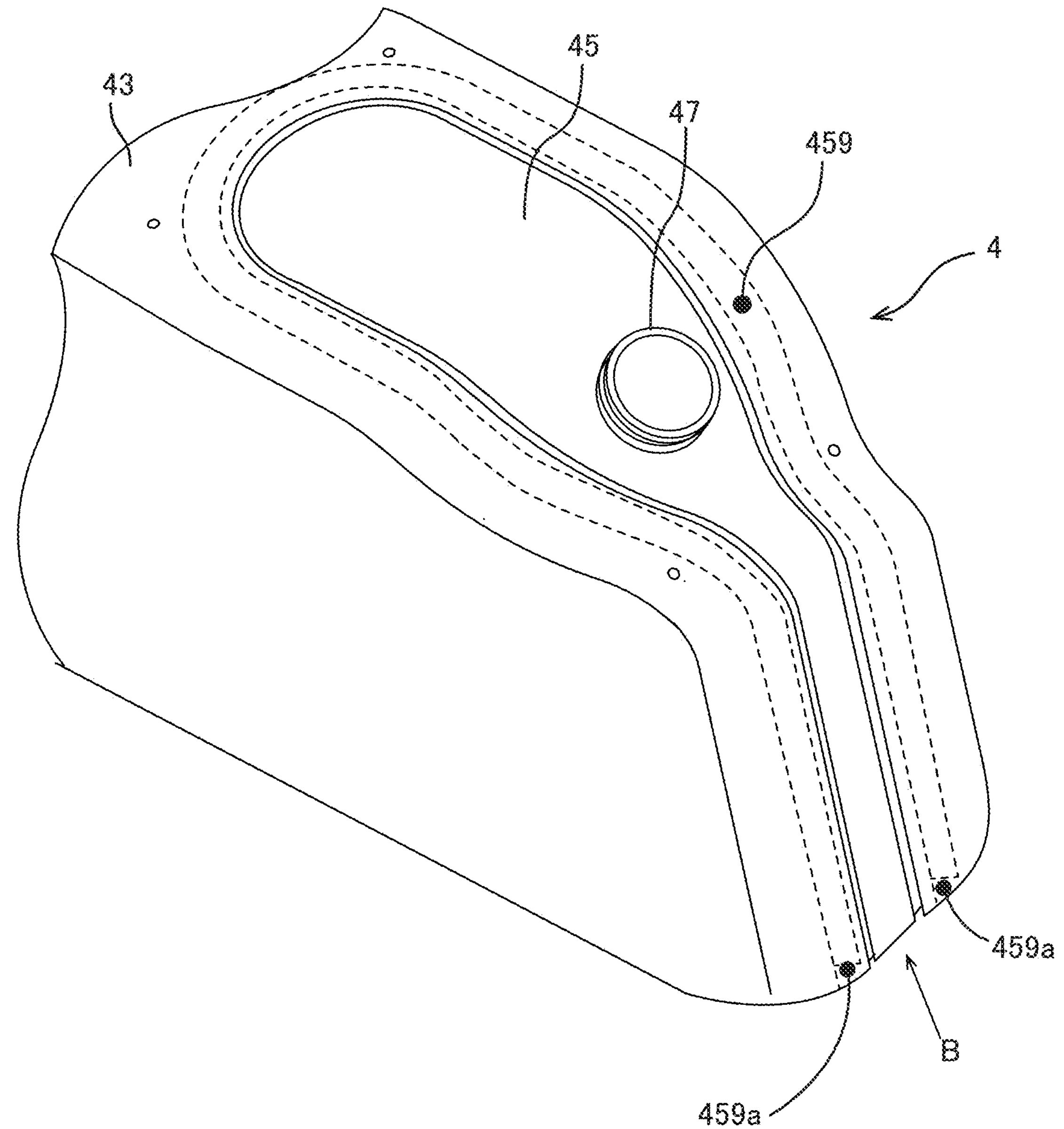
FIG. 6 is a perspective view in which a groove provided in a fixing plate is added to the second arm of FIG. 2.
Figure 7:
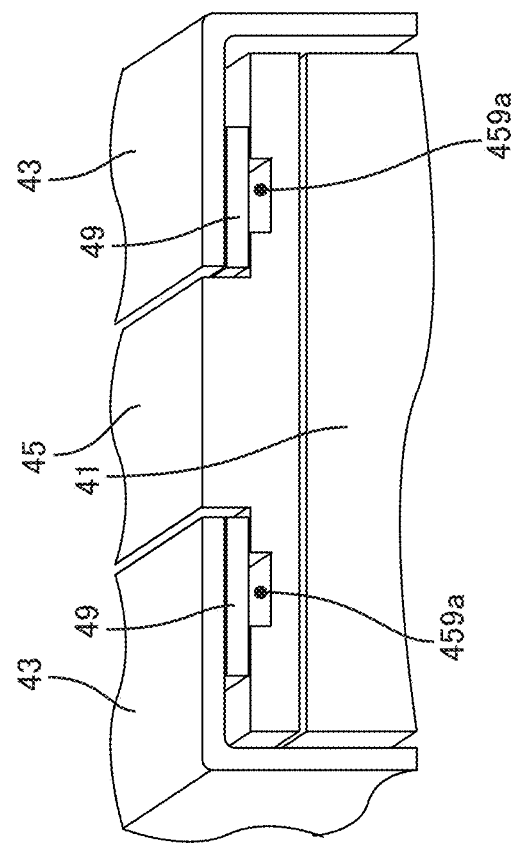
FIG. 7 is a view as seen from a B arrow direction of FIG. 6, showing the ends of the groove of the seal structure according to the present embodiment.

As shown in FIG. 4, FIG. 5, and FIG. 6, the fixing plate 45 has a linear groove 459 that receives liquid that has entered between the fixing plate 45 and the sealing member 49. Typically, the groove 459 has a substantially U-shape that matches the peripheral shape of the cutout portion 435 of the cover 43 (shape of the sealing member 49), and is provided in the peripheral portion of the fixing plate 45 that the sealing member 49 contacts. The groove 459 has a drain port for draining the received liquid to the outside. As shown in FIG. 7, both ends of the U-shaped groove 459 reach the lower end of the fixing plate 45 and are open to the outside. An end portion 459*a* of the groove 459 which is open to the outside corresponds to the drain port. By providing the end portion 459*a* of the groove 459 at the lower end portion of the fixing plate 45, which is L-shaped in side view, the liquid received by the groove 459 can be guided to the end portion 459*a* of the groove, which is located below in the direction of gravity. In order to make it easier to guide the liquid received by the groove 459 to the end portion 459*a* of the groove 459 even if the fixing plate 45 is a flat plate, the depth of the groove 459 provided in the fixing plate 45 may be made deeper toward the end portion 459*a* of the groove 459, which is the drain port.

According to the seal structure of the present embodiment, the sealing member 49 sandwiched between the cover 43 and the fixing plate 45 can prevent the liquid that has flown in from the outside from entering between the cover 43 and the fixing plate 45. Even if the liquid is allowed to enter between the fixing plate 45 and the sealing member 49, the liquid that has entered can be received by the groove 459 provided in the fixing plate 45, preventing the liquid from passing between the fixing plate 45 and the sealing member 49 and entering the inside of the second arm 4. The liquid received by the groove 459 is guided to the end portion 459*a* of the groove 459 along the groove 459, and drained to the outside. Therefore, it is possible to avoid a situation in which the liquid received by the groove 459 again enters the gap between the fixing plate 45 and the sealing member 49 for some reason and reaches the inside of the second arm 4. As described above, the seal structure according to the present embodiment can achieve two sealing effects, i.e., the sealing effect by the sealing member 49 and the sealing effect by the groove 459 provided in the fixing plate 45, so that it is more effective in sealing than the seal structure using only the sealing member 49. Even when the liquid breaks through the sealing member 49 and enters between the fixing plate 45 and the cover 43, the liquid that has entered can be received by the groove 459 provided in the fixing plate 45, allowing the liquid to enter between the fixing plate 45 and the cover 43 to some extent. Therefore, it is not necessary to firmly fasten the cover 43 and the fixing plate 45 with the sealing member 49 sandwiched therebetween, and it is not necessary to use many bolts at a narrow pitch for fastening. According to the seal structure of the present embodiment, it is possible to achieve a seal structure that does not significantly impair the appearance.

In addition, deterioration of the sealing effect by the sealing member 49 due to aging or the like is inevitable. In addition, changes in the members over time, such as deformation of the cover 43, deformation of the fixing plate 45, and deterioration of the bolts, may weaken the force that fastens the cover 43 to the fixing plate 45, resulting in a decrease in surface pressure, which may deteriorate the sealing effect by the sealing member 49. On the other hand, the function of receiving the liquid that has entered between the fixing plate 45 and the sealing member 49 by the groove 459 does not change over time, and is hardly affected by a decrease in surface pressure. Therefore, even if the sealing effect of the sealing member 49 deteriorates over time, or even if the sealing effect deteriorates due to a decrease in surface pressure, the seal structure of the present embodiment can slow the rate of deterioration. As already explained, the seal structure according to the present embodiment is more effective in sealing than the sealing member 49 alone in nature, and furthermore, the rate of deterioration in sealing effect over time is slower; therefore, the situation in which liquid is allowed to enter the inside of the second arm 4 and adheres to the inside of the second arm 4 before maintenance to replace the sealing member 49 can be suppressed.

Figure 8:
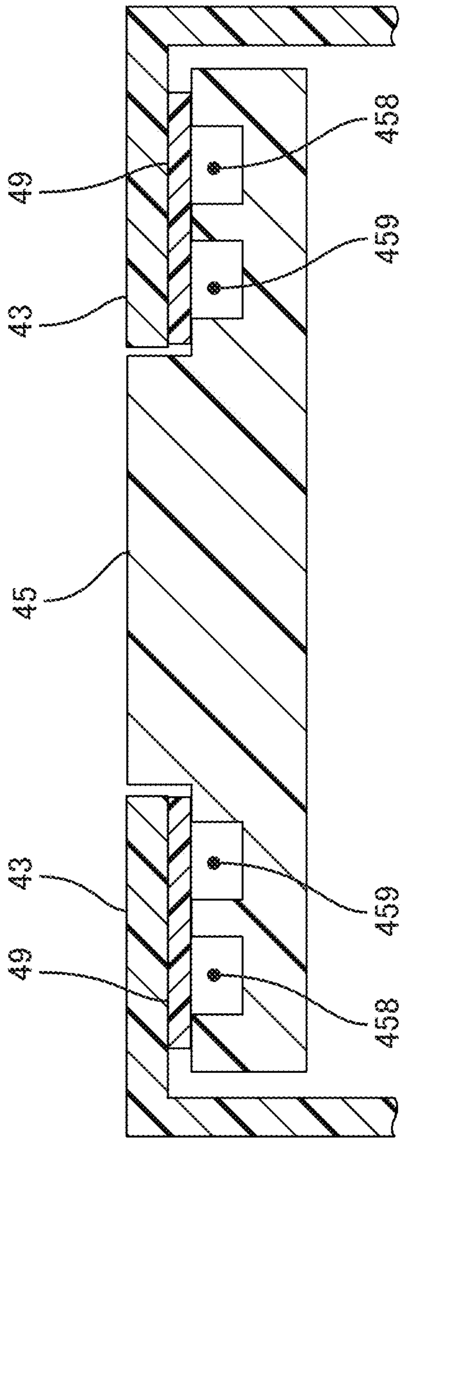
FIG. 8 is a cross-sectional view taken along line A-A' in FIG. 3, showing another example of the seal structure according to the present embodiment.

In the seal structure according to the present embodiment, the fixing plate 45 (first member) has one groove 459. However, as shown in FIG. 8, the fixing plate 45 may have a plurality of grooves 458, 459. Assuming that the grooves are designed to receive a specific volume of liquid, providing a plurality of grooves allows the depth of each groove to be shallower than when only one groove is provided. This makes it possible to apply the seal structure of the present embodiment even when the fixing plate 45 is thin. In addition, when a plurality of grooves 458, 459 are provided in the fixing plate 45, the plurality of grooves 458, 459 may have the same width and depth or different widths and depths.

Figure 9:
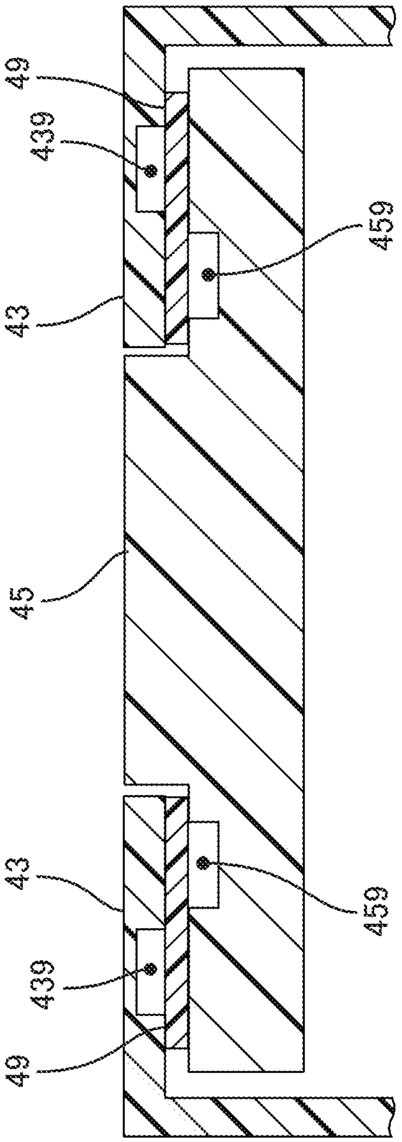
FIG. 9 is a cross-sectional view taken along line A-A' in FIG. 3, showing another example of the seal structure according to the present embodiment.

In the seal structure according to the present embodiment, the groove 459 is provided only in the fixing plate 45 (first member). This is because the fixing plate 45 (first member) and the cover 43 (second member) are in a positional relationship in which the fixing plate 45 is disposed below the cover 43, and therefore the liquid that has reached between the fixing plate 45 and the cover 43 is easily guided between the sealing member 49 and the fixing plate 45, which is lower in the direction of gravity. However, as shown in FIG. 9, the seal structure according to the present embodiment may be configured with not only the groove 459 in the fixing plate 45 but also a groove 439 in the cover 43. Although not shown, the groove 439 may be provided only in the cover 43 (second member).

Figure 10:
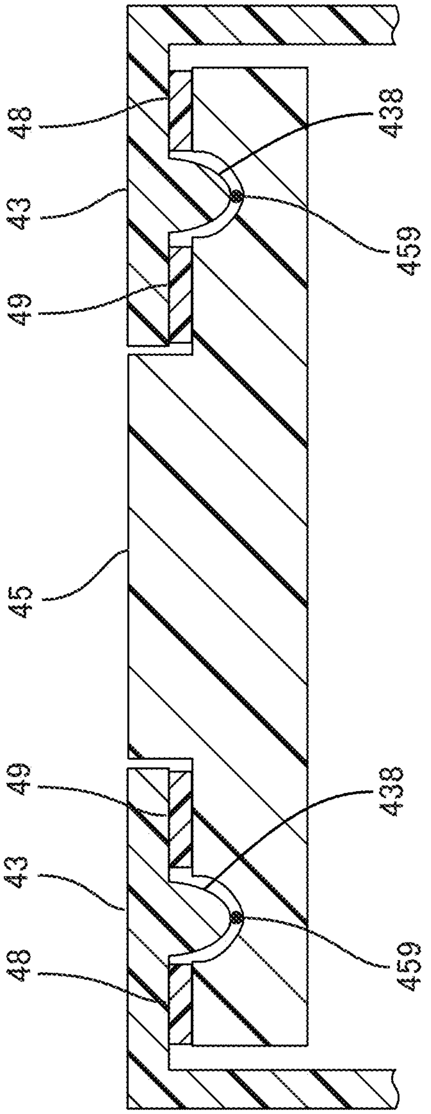
FIG. 10 is a cross-sectional view taken along line A-A' in FIG. 3, showing another example of the seal structure according to the present embodiment.

In the seal structure according to the present embodiment, the groove 459 is provided at a location where the sealing member 49 contacts. This allows the liquid that has entered between the sealing member 49 and the fixing plate 45 to be received by the groove 459, thereby preventing the liquid from adhering to the parts and wire bodies inside the second arm 4. As long as the adhesion of the liquid to the parts and wire bodies inside the second arm 4 can be prevented as described above, the groove 459 may be provided at a location where the sealing member 49 does not contact. For example, as shown in FIG. 10, in the fixing plate 45, the groove 459 is located inside the sealing member 49, on the surface of the fixing plate 45, near the periphery edge. This allows the liquid that has passed between the sealing member 49 and the fixing plate 45 to be received by the groove 459, thereby preventing the liquid from adhering to the parts and wire bodies inside the second arm 4. The liquid that has flown into the groove 459 flows downward in the direction of gravity along the groove 459, and is drained to the outside from the drain port at the end.

As shown in FIG. 10, in order to prevent the liquid that has passed between the sealing member 49 and the fixing plate 45 from further entering the inside of the second arm 4, a linear projection 438 is provided on the back side of the cover 43 at a position aligned with the groove 459 provided in the fixing plate 45. The linear projection 438 has a transverse sectional shape that is slightly smaller than the transverse sectional shape of the groove 459. As a result, with the cover 43 fastened to the fixing plate 45, a labyrinth gap having a U-shaped transverse section is formed between the projection 438 provided on the cover 43 and the groove 459 provided in the fixing plate 45. By narrowing the labyrinth gap, the viscous frictional resistance of the liquid can prevent the liquid from entering the inside of the second arm 4 or can reduce the rate of entry, and the liquid received during that time can be drained to the outside along the groove 459. Assuming a situation in which the liquid passes through the labyrinth gap, as shown in FIG. 10, another sealing member 48 may be further disposed between the fixing plate 45 and the cover 43, at a position inside the groove 459 formed in the fixing plate 45 and the projection 438 formed on the cover 43. Since a three stage seal structure can be configured with the outer sealing member 49, the labyrinth structure of the groove 459 of the fixing plate 45 and the projection 438 of the cover 43, and the inner sealing member 48, the sealing effect is high, and a situation in which liquid enters between the cover 43 and the fixing plate 45 from the outside and adheres to the parts inside the second arm 4 can be avoided.

In the present embodiment, an end of the groove 459 provided in the fixing plate 45 reaches the lower end of the fixing plate 45, and that end portion 459*a* is the drain port, which is exposed to the outside. As a result, the liquid that has entered between the sealing member 49 and the fixing plate 45 can be received by the groove 459 and drained to the outside from the end portion 459*a*. However, the drainage structure is not limited to the present embodiment as long as the liquid received by the groove 459 can be drained to the outside. For example, the end portion 459*a* of the groove 459, which serves as the drain port, does not have to be provided at an end of the fixing plate 45. In addition, the liquid received by the groove 459 may be drained at a midway point of the groove 459. In this case, for example, a hole penetrating the fixing plate 45 may be formed in the bottom of the groove 459, one end of a drain pipe may be fixed to the hole, and the other end of the drain pipe may be disposed outside. Further, the groove 459 may be configured such that a part thereof is exposed to the outside, and the part of the groove 459 exposed to the outside may be used as a drain port so that the liquid received by the groove 459 can be drained.

From the viewpoint of only preventing the liquid from entering the second arm 4, the end of the groove 459 does not have to necessarily be exposed to the outside as long as the groove 459 can receive the liquid that has entered between the sealing member 49 and the fixing plate 45. In the first place, the space between the cover 43 and the fixing plate 45 is sealed by the sealing member 49, and only a very small amount of liquid may enter between the sealing member 49 and the fixing plate 45. Also in this sense, the groove 459 should only be able to receive the liquid that has entered between the sealing member 49 and the fixing plate 45. If there is a lot of liquid to be received, a water storage recess with a large capacity to receive liquid may be formed in the middle of the groove 459.

Further, the received liquid may be stored in another device such as a water storage tank provided outside the second arm 4, instead of being drained to the outside from the drain port at the end of the groove 459. In this case, the end of the groove 459 is connected to another device or an elongated cylinder, such as a hose, extending from another device.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A seal structure for an arm constituting a robot, the seal structure comprising:

an arm base;

a cover disposed on the arm base and having a cutout portion;

a fixing plate fixed to the cutout portion from an inside of the arm; and a sealing member interposed between the cover and the fixing plate, wherein the fixing plate includes a groove in a contact surface that contacts the sealing member and configured to receive liquid that has entered from outside between the fixing plate and the sealing member;

the groove includes a drain opening open to an outside of the arm;

the drain opening is disposed at a lower end portion of the fixing plate, and the groove is configured to cause the liquid received in the groove to flow along a direction of gravity to the drain opening.

* * * * *